United States Patent [19]

Newmark

[11] Patent Number: 5,289,925

[45] Date of Patent: Mar. 1, 1994

[54] ORGANIZATIONAL DISPLAY FOR COMPACT DISC JEWEL BOXES

[76] Inventor: Martin Newmark, P.O. Box 1338, Boulder, Colo. 80306

[21] Appl. No.: 851,854

[22] Filed: Mar. 16, 1992

[51] Int. Cl.⁵ .............................................. A47F 7/00
[52] U.S. Cl. ........................................ 211/40; 211/41
[58] Field of Search .................... 211/40, 41; 312/8, 9, 312/10

[56] References Cited

U.S. PATENT DOCUMENTS

| | | | |
|---|---|---|---|
| 3,733,523 | 5/1973 | Reynolds et al. | 211/41 X |
| 3,737,046 | 6/1973 | Jeter | 312/10 X |
| 4,231,625 | 11/1980 | Perez et al. | 312/10 X |
| 4,629,067 | 12/1986 | Paulik et al. | 211/41 X |
| 4,657,146 | 4/1987 | Walters | 211/41 |
| 4,971,206 | 11/1990 | Lemmerman et al. | 211/41 |
| 5,019,939 | 5/1991 | Reimer | 211/41 X |

FOREIGN PATENT DOCUMENTS 632145  6/1936  Fed. Rep. of Germany ........ 211/41

Primary Examiner—Robert W. Gibson, Jr.

[57] ABSTRACT

The Organizational Display for Compact Disc Jewel Boxes (ODCDJB) is designed to organize the cases of Compact Discs (CD) in a manner that is compact yet allows viewing of a large portion of the front face of the CD case and easy access to any of the cases displayed without disturbing adjacent cases. The ODCDJB is useful for organizing the cases of the CD's in a CD Changer.

15 Claims, 2 Drawing Sheets

ORGANIZATIONAL DISPLAY FOR COMPACT DISC JEWEL BOXES

BACKGROUND OF THE INVENTION

In recent years the Vinyl Record Album (LP) has been replaced with a new, more reliable, more convenient format known as the Compact Disc (CD). Initially the devices for playing the music on CD's held only one disc at a time. These particular devices leave no question as to what disc is currently in the player. The listener would simply leave that CD's case somewhere, perhaps on top of the CD player, thereby easily allowing the listener to know which CD is in the player. A CD case is analogous to the LP's carboard sleeve. A CD case is typically a plastic box which is a container for the CD and artwork or brochure that describes the contents of the CD. For the purposes of this document a "Jewel Box" is defined to be a CD case and/or the artwork or brochure describing the CD.

More recently CD players have been advanced to hold more than one CD. These advanced machines are known as CD Changers. These CD Changers hold a plurality of CD's and allow the listener to play one of the CD's loaded in the machine thus allowing the listener to change the CD being listened to at the press of a button. This button could be on the machine itself or on a remote control keypad. These new CD Changers, having an internal organization for the CD's loaded within them, make it necessary for the listener to know this organization in order to select a specific CD for play. Most of the CD Changers on the market today have no way of making this organization available to the user without physically opening the changer and visually inspecting its contents. The alternative to this is to organize the Jewel Boxes in a manor that is similar to the internal organization of the CD's in the changer.

The prior art solution to this problem is to simply stack the Jewel Boxes in the same order that the CD's are stored in the CD Changer. There are several problems inherent in this solution. The organization of the CD's in the changer cannot be visually determined from a distance by the listener. Most of the currently available CD Changers have remote controls that allow the listener to control the changer from across a room. This prior art solution does not allow the user to do this because the contents of the CD written on the edge of the Jewel Box is un-readable from a distance. Another inherent problem with the prior art solution is that to access a Jewel box in the center of the stack, Jewel Boxes on either side of it must be handled. This handling makes it possible to get the Jewel Boxes out of order with respect to the order inside the CD Changer. Finally, stacking the Jewel Boxes on top of one another will eventually scratch the Jewel Boxes making them unattractive.

Displays can be found in the prior art that address the problem of displaying flat objects in general and Jewel Boxes in particular. U.S. Pat. Nos. 4,940,147 by Douglas J. Hunt, 4,951,826 by Rodney R. Tompkins, and U.S. Pat. No. 3,550,786 by Otto C. Brown are such items in the prior art. None of these items solve the problems addressed by the Organizational Display for Compact Disc Jewel Boxes (ODCDJB). The prior art typically deals with displaying Jewel Boxes with an artistic intent. A specific organization is not outlined, and other below mentioned objectives of the current invention are not met.

SUMMARY OF THE INVENTION

A solution to the above-stated problem discovered by the applicant and the subject of this application has the objective of displaying the Jewel Boxes in a manner that organizes the Jewel boxes in the same way that a CD Changer has the CD's organized. A further objective of the ODCDJB is to allow the listener to immediately visually determine the position of each CD in the CD Changer from a distance. Another objective of the ODCDJB is to allow easy access to individual Jewel Boxes without disturbing any of the other Jewel Boxes in the display. "Disturb", for the purposes of this document, is defined as easily upsetting any other Jewel Box contained in an ODCDJB to the point at which the other Jewel Box falls over or out of the ODCDJB. Yet another objective of the ODCDJB is to ensure that Jewel Boxes never touch one another so that damage due to contact with other Jewel Boxes is avoided. Another objective of the ODCDJB is to be a width that fits into a space defined by the width of existing CD Changers making the invention an attractive addition to the listeners decor which does not take up an inordinate amount of space yet still meets its other objectives.

DESCRIPTION OF THE PREFERRED EMBODIMENT

The ODCDJB is composed of a base and on top of this base is a plurality of slots. The number of slots in the ODCDJB will be the same as the number of CD's that can be placed in any one of the several configurations of CD Changers. This number in the preferred embodiment is 5, but it is also unlimited.

The length of the slots is approximately the width of a Jewel Box and has a cross-sectional shape that allows a Jewel Box, when placed in it, to stand at an angle such that the Jewel Box will not fall over but is at a pleasant angle for viewing the front of the Jewel box.

These slots are arranged on top of the base at an angle when looking down on the invention from above. This angle causes one end of all slots to be at the front of the base and the other end of the slots to be at the back of the base. When Jewel Boxes are placed in the slots they have a tiled appearance yet enough of the front of each Jewel Box is visible for the listener to ascertain it's identity and location in the CD Changer.

The material for the present invention is predetermined. Many materials will suffice including metal, wood, or plastic. There is also an infinite number of decorative embellishments that can complement the current design. Any material and decorative embellishment is considered to be included as part of the current invention since they will not change the utility of the current invention.

Figure 1:
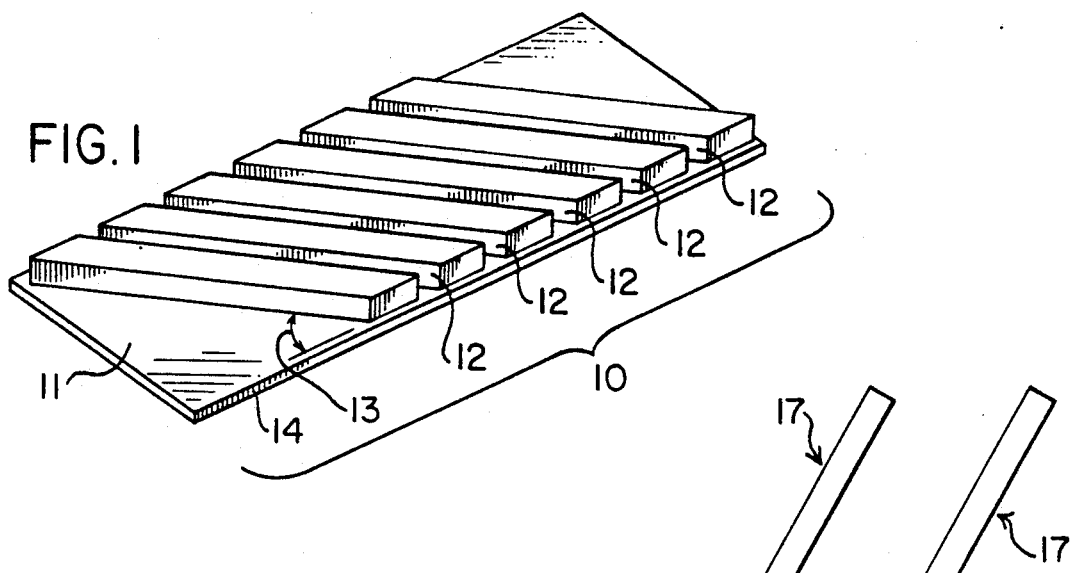
FIG. 1 shows the invention from an oblique view.

FIG. 1 shows an Organizational Display for Compact Disc Jewel Boxes from an oblique perspective. The ODCDJB in it's entirety is referred to as item 10. The ODCDJB consists of a base 11 and a plurality of slots 12 situated on top of base 11 at a predetermined angle 13 relative to the front 14 of the base.

Figure 2:
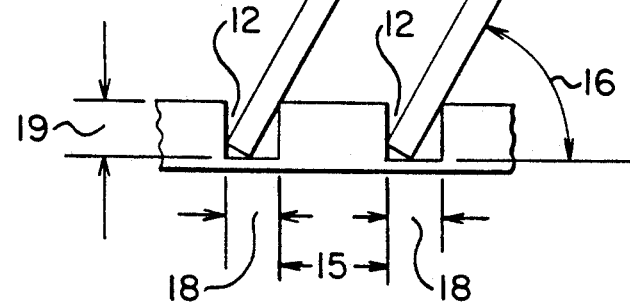
FIG. 2 shows a cross sectional view of two slots with Jewel boxes placed in the slots.

FIG. 2 is a view of a portion of the ODCDJB showing the profile of slots 12. The slots width 18 and depth 19 are arranged such that the Jewel Box 17 rests at an angle 16. Width 18 and depth 19 are also arranged such that Jewel box 17 does not fall over when placed in slot 12. Slot 12 is not limited to the shape shown. Slot 12 could have the cross sectional shape of a partial circle or have a lip at the top to help prevent the Jewel Box from falling over. Slot 12 is also not limited to run the full width of a Jewel Box. It could, for instance, be formed from one or several sections in order to conserve material.

Figure 3:
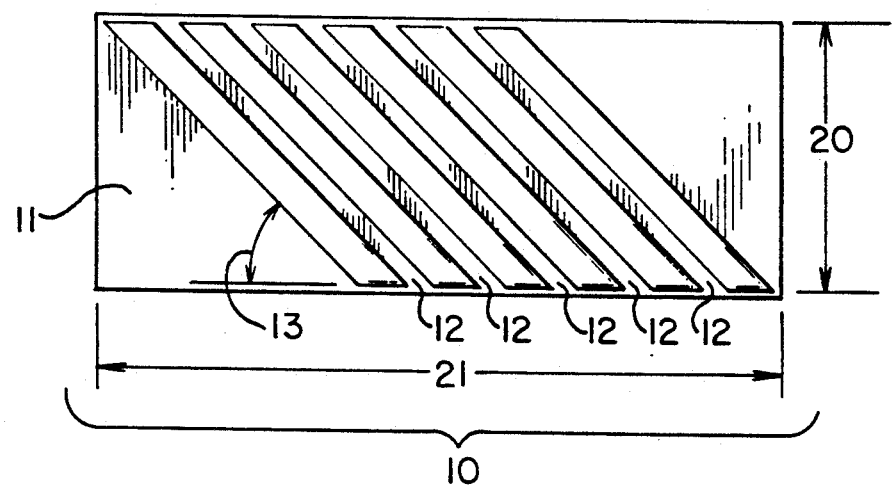
FIG. 3 shows a top view of the invention.

FIG. 3 shows a top view of the ODCDJB and clearly illustrates a predetermined angle 13 at which slots 12 are placed in relation to base 11. Also illustrated in FIG. 3 is the depth 20 of the ODCDJB 10. Depth 20 allows for the length of a Jewel Box 17 at an angle 13 to rest completely on top of base 11.

Figure 4:
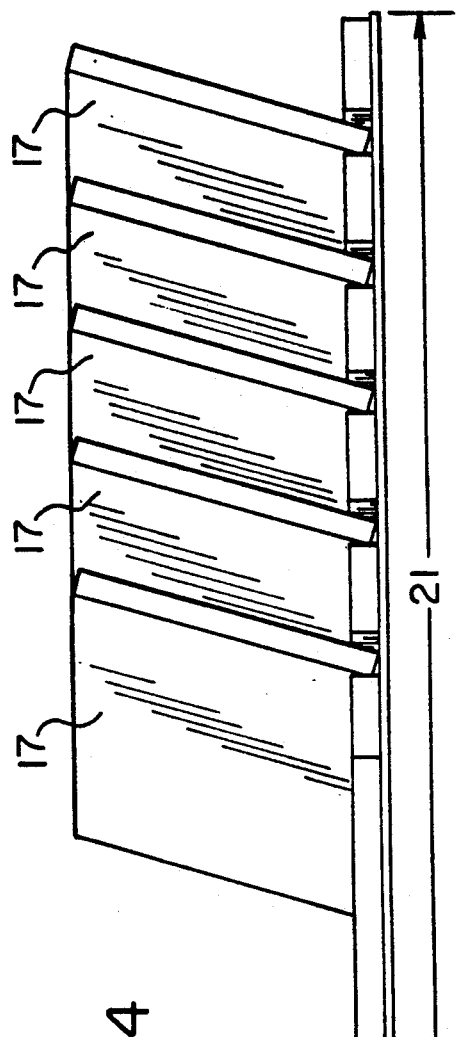
FIG. 4 shows a view looking straight on at the invention (with Jewel Boxes placed in it) from the perspective of the listener.

FIG. 4 shows a front view of the ODCDJB 10 loaded with Jewel Boxes 17 and the width of the ODCDJB 21.

Figure 5:
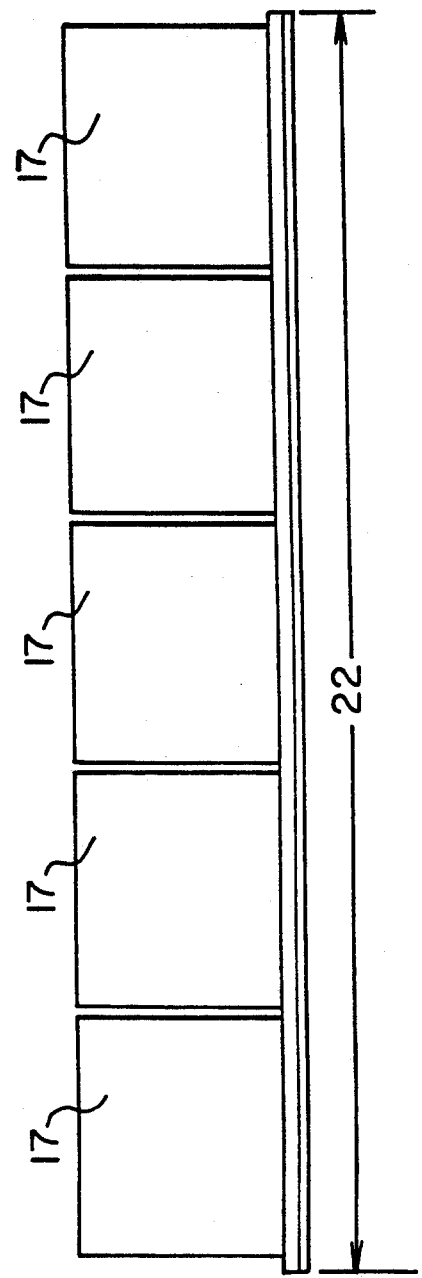
FIG. 5 shows Jewel Boxes placed side by side to illustrate one advantage of the ODCDJB.

FIG. 5 shows the total width 22 required if Jewel Boxes 17 were arranged side by side. The advantage of the ODCDJB that FIG. 5 illustrates is that the width of the ODCDJB 21 is less than width 22 while still leaving a significant portion of the face of a Jewel Box visible.

I claim:

1. An organizational display for compact disc jewel boxes comprising:
   a) a base;
   b) a plurality of slots organized on said base such that the front faces of the jewel boxes inserted in the display are visible to a user of said display and capable of being inserted and removed by said user from said slots easily without disturbing adjacent jewel boxes;
   c) said slots have a cross sectional area such that when a jewel box is placed in one of the slots, said jewel box's face will be almost entirely outside of said slot and said jewel box will remain in a stable position;
   d) and said slots having a length;
   e) said length of said slots is at a nonorthogonal angle from the front of said base towards the back of said base when looking down on said display.

2. An organizational display for compact disc jewel boxes as in claim 1 wherein said slots are parallel to one another.

3. An organizational display for compact disc jewel boxes as in claim 2 such that said nonorthogonal angle is 45 degrees.

4. An organizational display for compact disc jewel boxes as in claim 3 in which greater than 35 percent of each and every said jewel box's front face is visible from directly in front of the display.

5. An organizational display for compact disc jewel boxes as in claim 16 such that;
   a) said slots are substantially rectangular when looking at their cross section;
   b) said slots being open on top with two side walls and a bottom when looking down the axis of their length;
   c) said walls being substantially orthogonal to the bottom of said slots.

6. An organizational display for compact disc jewel boxes that comprises:
   a) a plurality of slots into which jewel boxes are placed;
   b) said slots organized such that when said jewel boxes are placed in said slots a portion of the face of said jewel boxes is visible and user access to individual jewel boxes is allowed without disturbing or damaging adjacent jewel boxes;
   c) the organization of said slots allows the listener to visually determine from substantially in front of the display which compact disc is in each location in a compact disc changer;
   d) said slots being on a base;
   e) said slots being arranged on said base such that each slot is at a nonorthogonal angle from the front of said base towards the rear of said base.

7. An organizational display for compact disc jewel boxes as in claim 6 in which greater than 35 percent of each and every said jewel box's front face is visible from directly in front of the display.

8. An organizational display for compact disc jewel boxes as in claim 6 such that;
   a) said slots are substantially rectangular when looking at their cross section;
   b) said slots being open on top with two side walls and a bottom when looking down the axis of their length;
   c) said walls being substantially orthogonal to the bottom of said slots.

9. An organizational display for compact disc jewel boxes as in claim 6 wherein said slots are parallel to one another.

10. An organizational display for compact disc jewel boxes as in claim 9 such that said nonorthogonal angle is 45 l degrees.

11. An organizational display for compact disc jewel boxes which comprises:
    a) a means for displaying a plurality of jewel boxes;
    b) said means organizing said jewel boxes in a manner corresponding to the order in which compact discs associated to said jewel boxes are loaded into a compact disc changer;
    c) said means also confining said jewel boxes such that any one jewel box can be inserted or removed from the organizational display without disturbing any other jewel box currently inserted into said organizational display;
    d) said means comprising a plurality of slots on a base;
    e) said slots being oriented on said base such that the length of said slot is at a nonorthogonal angle from the front of said base to the rear of said base when looking down on said organizational display for compact disc jewel boxes.

12. An organizational display for compact disc jewel boxes as in claim 11 in which greater than 35 percent of each and every said jewel box's front face is visible from directly in front of the display.

13. An organizational display for compact disc jewel boxes as in claim 11 wherein said slots are parallel to one another.

14. An organizational display for compact disc jewel boxes as in claim 11 such that said nonorthogonal angle is 45 degrees.

15. An organizational display for compact disc jewel boxes as in claim 11 such that;
    a) said slots are substantially rectangular when looking at their cross section;
    b) said slots being open on top with two side walls and a bottom when looking down the axis of their length;
    c) said walls being substantially orthogonal to the bottom of said slots.

* * * * *